United States Patent
Russel et al.

(10) Patent No.: US 9,656,430 B2
(45) Date of Patent: May 23, 2017

(54) ROTATING PRECISION RAILS IN THREE-DIMENSIONAL OBJECT PRINTING SYSTEMS

(71) Applicant: Xerox Corporation, Norwalk, CT (US)

(72) Inventors: Steven M. Russel, Bloomfield, NY (US); Jeffrey J. Bradway, Rochester, NY (US); Jorge M. Rodriguez, Webster, NY (US); Paul M. Fromm, Rochester, NY (US); Paul F. Sawicki, Rochester, NY (US); Robert B. Anderson, Jr., Syracuse, NY (US); Alicia S. Mruthyunjaya, Penfield, NY (US); Eliud Robles Flores, Rochester, NY (US); Erwin Ruiz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 14/692,809

(22) Filed: Apr. 22, 2015

(65) Prior Publication Data
US 2016/0311170 A1    Oct. 27, 2016

(51) Int. Cl.
*B29C 67/00* (2017.01)
*B33Y 10/00* (2015.01)
(Continued)

(52) U.S. Cl.
CPC ...... *B29C 67/0096* (2013.01); *B29C 67/0051* (2013.01); *B29C 67/0055* (2013.01); *B29C 67/0059* (2013.01); *B29C 67/0085* (2013.01); *B29C 67/0092* (2013.01); *B33Y 10/00* (2014.12); *B33Y 30/00* (2014.12); *B33Y 40/00* (2014.12)

(58) Field of Classification Search
CPC ........... B29C 67/0051; B29C 67/0055; B29C 67/0059; B29C 67/0085; B29C 67/0092; B29C 67/0096; B33Y 10/00; B33Y 30/00; B33Y 40/00
USPC ................ 425/225, 232, 375, 174.4; 134/49, 134/122 R; 104/279; 264/39
See application file for complete search history.

(56) References Cited

U.S. PATENT DOCUMENTS

| | | | |
|---|---|---|---|
| 2,765,547 | A | 10/1956 | Dimmel et al. |
| 2,944,275 | A | 7/1960 | Markusen |

(Continued)

FOREIGN PATENT DOCUMENTS

EP    2 474 418 B1    7/2012

*Primary Examiner* — Matthew Daniels
*Assistant Examiner* — Lawrence D Hohenbrink, Jr.
(74) *Attorney, Agent, or Firm* — Maginot Moore & Beck LLP

(57) ABSTRACT

A printer is configured to clean material from rails on which a cart rolls. The printer includes an ejector head configured to eject a material in a print zone, a first cylindrical member extending through the print zone, an actuator operatively coupled to the first cylindrical member and configured to axially rotate the first cylindrical member, a platform configured to move in a process direction along a surface of the first cylindrical member and receive material ejected by the ejector head in the print zone, and a first cleaner positioned to engage the surface of the first cylindrical member as the first cylindrical member is rotated by the actuator to remove material accumulated on the surface of the first cylindrical member.

20 Claims, 5 Drawing Sheets

(51) Int. Cl.
*B33Y 30/00* (2015.01)
*B33Y 40/00* (2015.01)

(56) References Cited

U.S. PATENT DOCUMENTS

| | | | |
|---|---|---|---|
| 5,904,100 A * | 5/1999 | Findley | A63H 19/15 |
| | | | 104/279 |
| 6,191,507 B1 | 2/2001 | Peltier et al. | |
| 6,688,021 B2 | 2/2004 | Baig et al. | |
| 7,070,250 B2 | 7/2006 | Lester et al. | |
| 8,167,395 B2 | 5/2012 | Fienup et al. | |
| 8,288,004 B2 | 10/2012 | Moorlag et al. | |
| 8,692,011 B2 | 4/2014 | Moorlag et al. | |
| 8,851,664 B2 | 10/2014 | Spence | |
| 2007/0134035 A1* | 6/2007 | Kageyama | G03G 21/0017 |
| | | | 399/346 |
| 2011/0125307 A1 | 5/2011 | Dickson et al. | |
| 2012/0157277 A1 | 6/2012 | Moorlag et al. | |
| 2013/0081549 A1* | 4/2013 | Stowe | B41F 31/027 |
| | | | 101/450.1 |
| 2013/0293652 A1 | 11/2013 | Spence et al. | |
| 2013/0293653 A1 | 11/2013 | Spence et al. | |
| 2014/0125749 A1* | 5/2014 | Spence | B41J 2/215 |
| | | | 347/104 |

* cited by examiner

ROTATING PRECISION RAILS IN THREE-DIMENSIONAL OBJECT PRINTING SYSTEMS

TECHNICAL FIELD

The system and method disclosed in this document relate to printers that produce three-dimensional objects and, more particularly, to cart transport mechanisms in printing systems that produce three-dimensional objects.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A portion of a previously known three-dimensional object printing system 10 is shown in FIG. 5. In the view depicted in that figure, a platform 14, called a cart, is configured to ride upon track rails 22 to enable the cart to move in a process direction P between printing stations, such as the printing station 26. Printing station 26 includes four ejector heads 30 as shown in the figure, although fewer or more ejector heads can be used in a printing station. Once the cart 14 reaches the printing station 26, the cart 14 transitions to precision rails 38. Precision rails 38 are cylindrical rail sections that are manufactured within tight tolerances to help ensure accurate placement and maneuvering of the cart 14 beneath the ejector heads 30. Linear electrical motors are provided within housing 42. These motors produce electromagnetic fields that interact with a magnet 46 connected to the lower end of the cart 14 to move the cart along the track rails 22 between stations and to move the cart on the rails 38 within a station 26. Once the cart 14 is beneath the printing station 26, the printheads are operated to eject material in synchronization with the motion of the cart. Additional motors (not shown) move the printing station 26 vertically and in an X-Y plane over the cart to form an object with layers of material ejected by the printheads. Alternatively, a mechanism can be provided to move the cart 14 vertically and in the X-Y plane to enable formation of the object on the cart. Once the printing to be performed by a printing station is finished, the cart 14 is moved along the rails 22 to another printing station for further part formation or for layer curing or other processing.

An end view of the cart 14 on the rails 38 is shown in FIG. 4. At a printing station 26, bearings 34 of the cart 14 are positioned on the precision rails 38 in an arrangement that facilitates accurate positioning of the build platen on the cart 14. Specifically, a pair of bearings 34 are positioned at a right angle to one another on one of the rails 38 to remove four degrees of freedom of the cart 14, while the other bearing 34 rests on the other rail 38 to remove one more degree of freedom. As described above, linear motors in housing 42 operate to interact with a magnet positioned within housing 46 to move the cart 14 over an upper surface 50 of the housing 42. Gravity and magnetic attraction between the motors in the housing and the magnet 46 hold the bearings 34 in contact with the rails 38.

When carts are not present underneath the ejector heads 30, errant drips of materials can fall from the ejector heads and produce undesired debris and contamination on the precision rails 38. Also, air-borne contaminants in the environment, such as dust or other particulate matter, can fall and collect on the rails 38. When these contaminants and debris are located at any interface between the bearings 34 and the rails 38, the linear velocity of the cart is disrupted and the quality of the printed object is affected. In order to produce three-dimensional objects with acceptable quality, the motion of the cart 14 beneath the ejector heads 30 needs to be precise. Therefore, improvements in three-dimensional printing systems that help eliminate the contamination on the precision rails that affects the accuracy of the placement and movement of the cart would be beneficial.

SUMMARY

A printer is configured to help remove materials from rails in the printer. The printer includes an ejector head configured to eject a material in a print zone, a first cylindrical member extending through the print zone, an actuator operatively coupled to the first cylindrical member and configured to axially rotate the first cylindrical member, a platform configured to move in a process direction along a surface of the first cylindrical member and receive material ejected by the ejector head in the print zone, and a first cleaner positioned to engage the surface of the first cylindrical member as the first cylindrical member is rotated by the actuator to remove material accumulated on the surface of the first cylindrical member.

A method for operating a printer helps remove materials from rails in the printer. The method includes operating with a controller a platform to move in a process direction along a surface of a first cylindrical member through a print zone of an ejector head, operating with the controller the ejector head to eject ink to a surface of the platform in the print zone, and operating with the controller an actuator to axially rotate the first cylindrical member in engagement with a first cleaner to remove material accumulated on the surface of the first cylindrical member.

BRIEF DESCRIPTION OF THE DRAWINGS

The foregoing aspects and other features of a printer that helps remove materials from rails within the printer are explained in the following description, taken in connection with the accompanying drawings.

DETAILED DESCRIPTION

Figure 1:
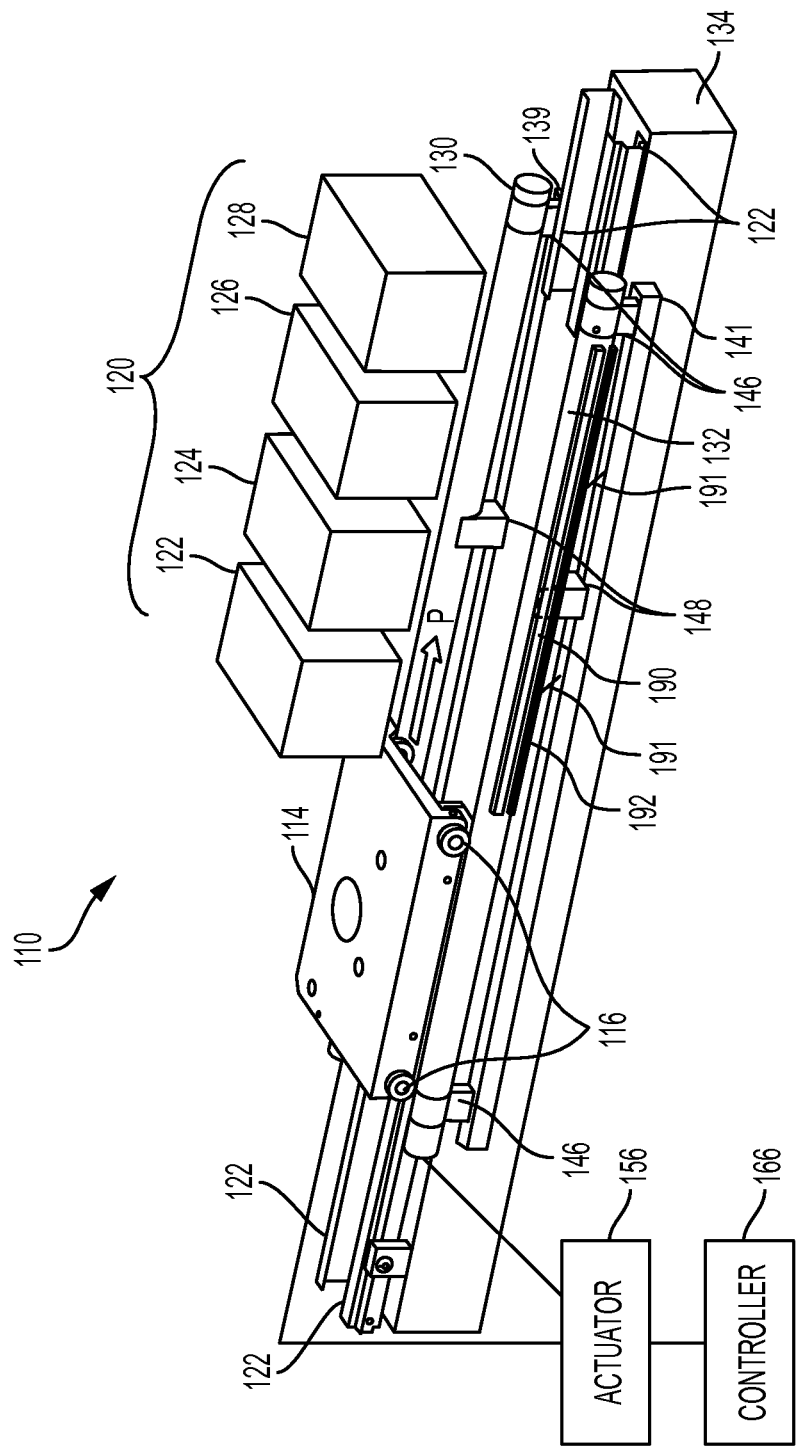
FIG. 1 is a perspective view of a three-dimensional printing system having rotating precision rails.

For a general understanding of the environment for the system and method disclosed herein as well as the details for the system and method, reference is made to the drawings. In the drawings, like reference numerals designate like elements.

Referring to FIG. 1, a three-dimensional printing system 110 includes a platform or cart 114 configured to ride upon track rails 122 (FIG. 1) that extend from housing 134. The interaction of the motors in the housing 134 with a magnet mounted to the bottom of the cart 114 enables the platform 114 to move on the rails 122 in a process direction P between printing stations, such as the printing station 120. The printing station 120 includes four ejector heads 122, 124, 126, 128 configured to eject material to form a three-dimensional object on the surface of the platform 114. Although four ejector heads are shown, in other embodiments fewer or more ejector heads are used in the printing station.

At the printing station 120, the cart 114 transitions to the precision rails 130, 132. The precision rails 130, 132 are generally parallel to each other and extend through a print zone below the ejector heads 122, 124, 126, and 128 of the printing station 120. The electrical motors (not shown) in the housing 134 continue to move the cart 114 as the bearings 116 support the cart on the rails 130, 132. As noted above, other motors (not shown) move the ejector heads in an X-Y plane that is parallel to the upper surface of the cart 114 and also move the ejector heads of the printing station 120 vertically with respect to the cart 114 to enable layers of material to be placed on top of one another to form an object. Alternatively, a mechanism can be provided to move the cart 114 vertically and horizontally with respect to the printheads to enable formation of an object on the top surface of the cart. Once the printing to be performed by a printing station is finished, the cart 114 is moved to another printing station or to a station for layer curing or other processing.

Figure 2:
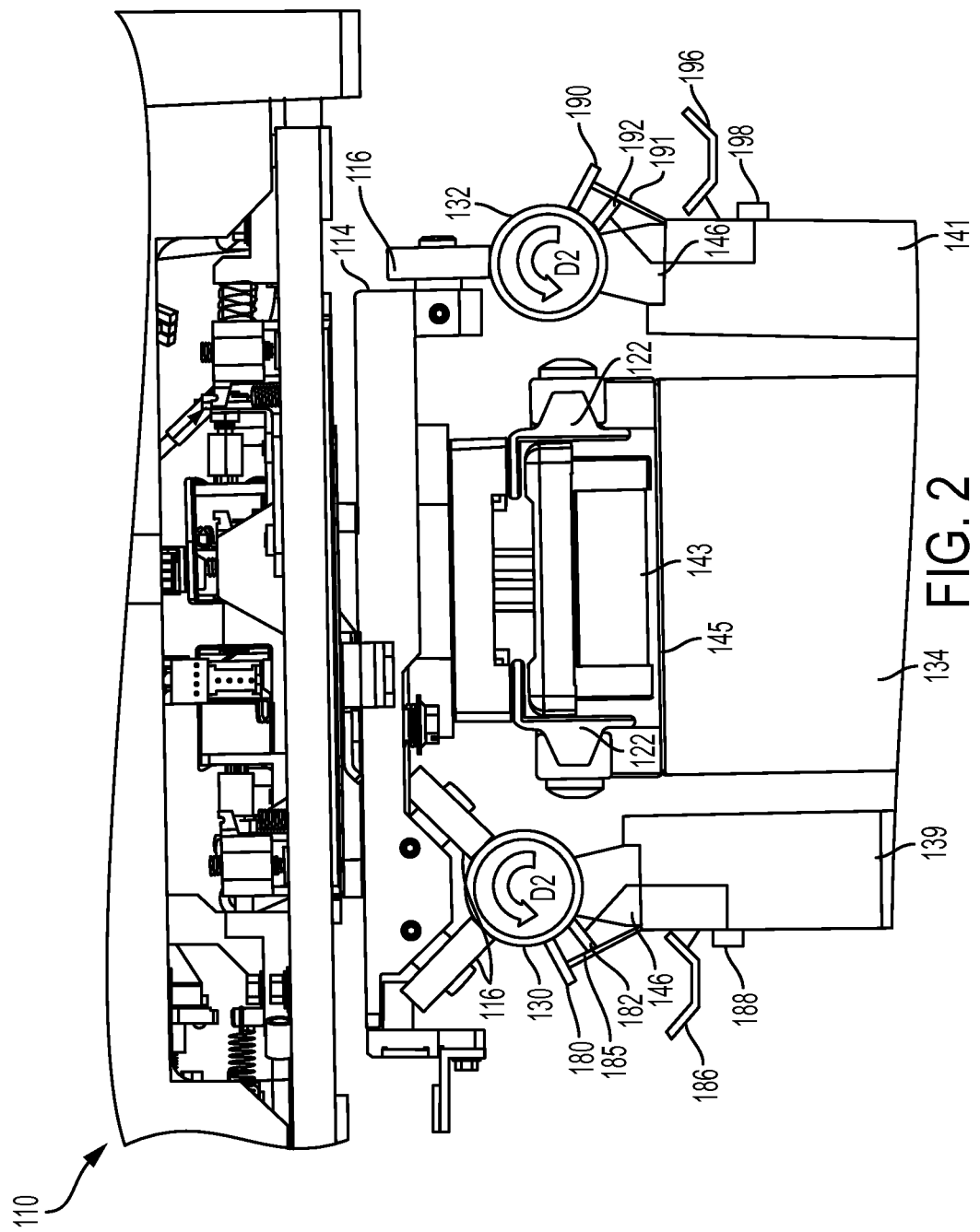
FIG. 2 is a front perspective view of the three-dimensional printing system of FIG. 1 showing the rotating precision rails and cleaners.

The linear electrical motors (not shown) within the housing 134 produce electromagnetic fields that interact with a magnet (not shown) within a lower housing 143 (FIG. 2) of cart 114 to move the cart 114 along the rails 122 between printing stations and to move the cart 114 along the precision rails 130, 132 within a printing station. With reference to FIG. 2, the interaction of the magnet (not shown) with the fields generated by the linear motors enable the cart 114 to glide over the platform 145. The rails 122 terminate at one end of a printing station and commence at a position where the cart 114 is past the printing station. The precision rails 130, 132 are provided within the print zone of the printing station for controlled movement of the cart at the station. Specifically, a pair of bearings 116 is positioned at a right angle to one another on one of the precision rails 130, while the other bearing 116 is perpendicular to the other precision rail 132.

Figure 3:
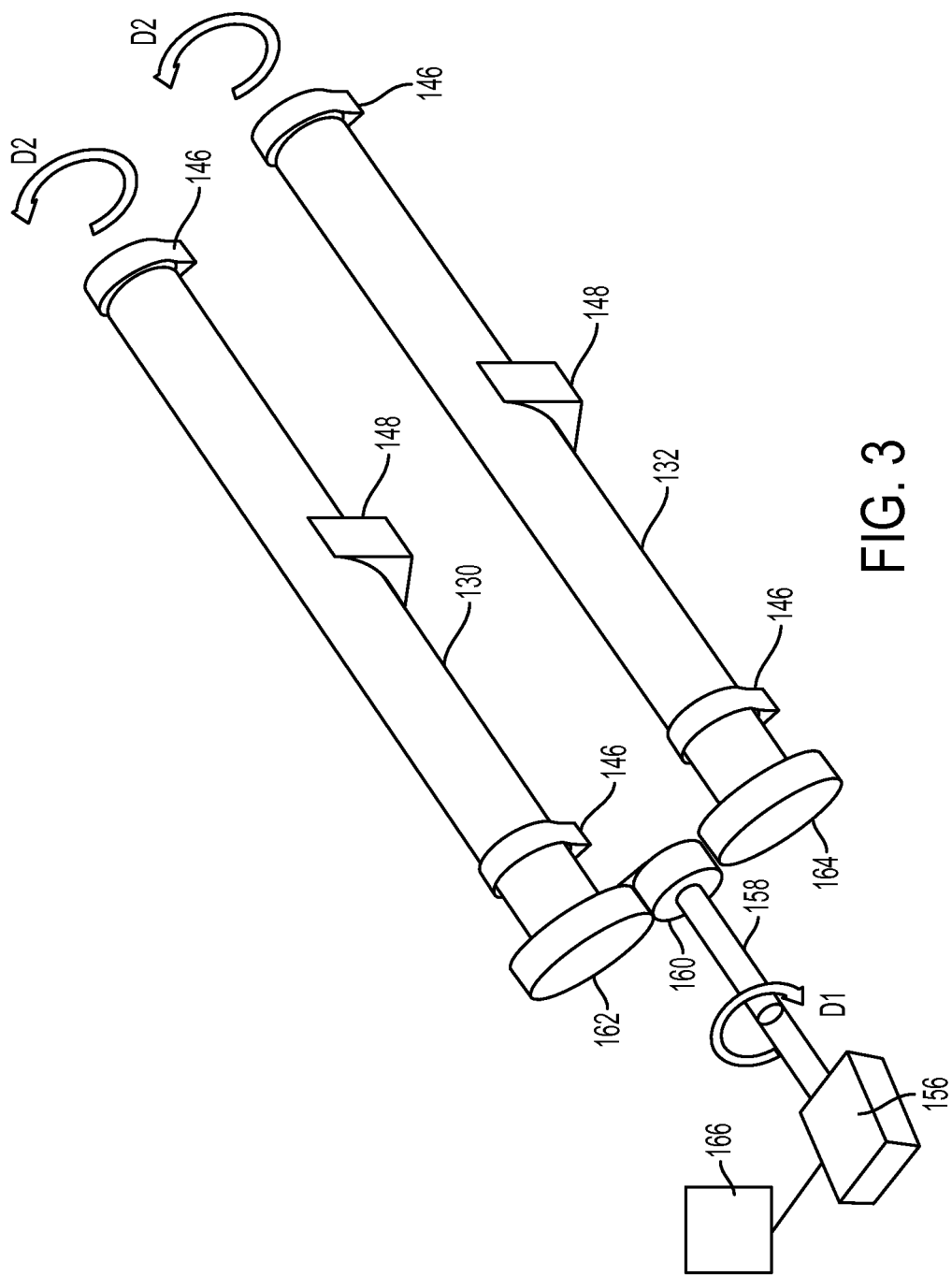
FIG. 3 is a partial perspective view of the rotating rails and actuator of the three-dimensional printing system of FIG. 1.
Figure 4:
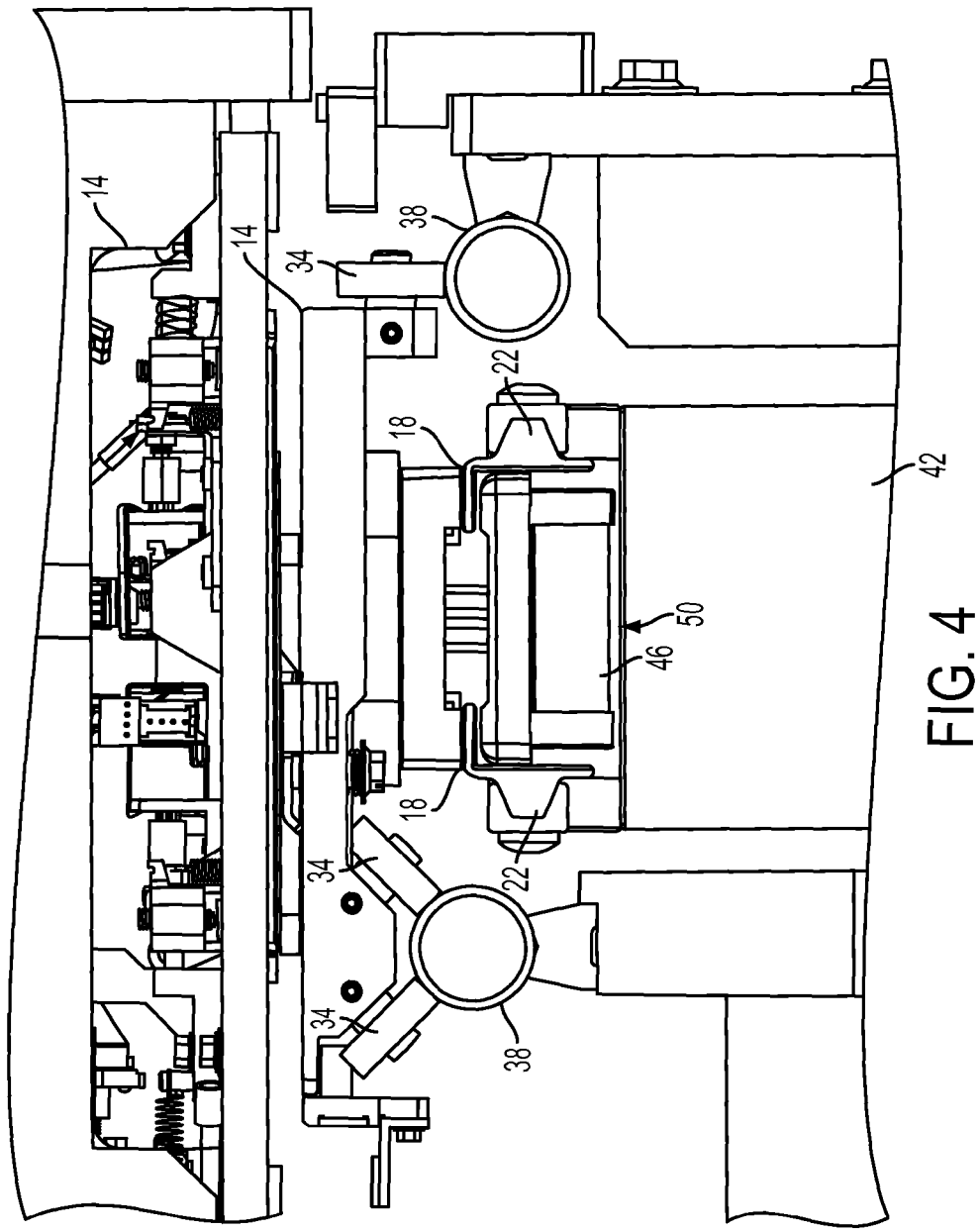
FIG. 4 is a perspective view of a prior art three-dimensional printing system.
Figure 5:
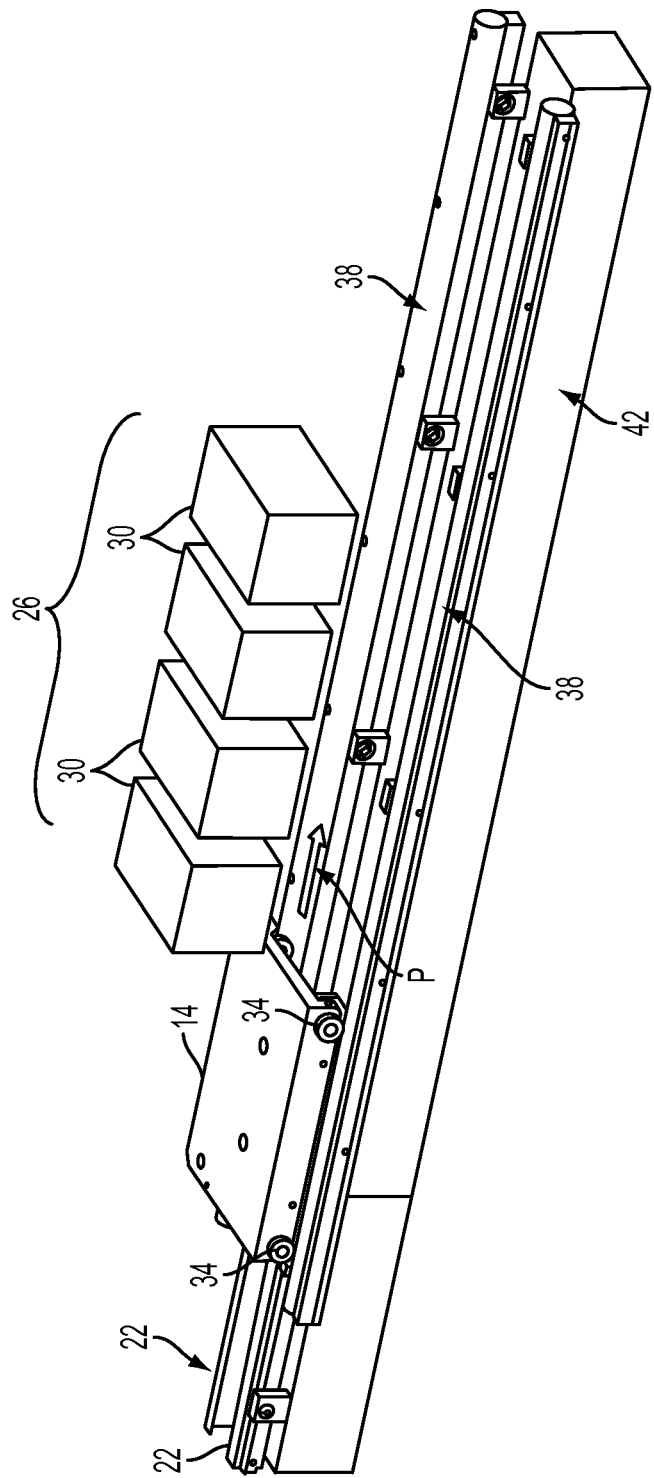
FIG. 5 is a front perspective view of the prior art three-dimensional printing system of FIG. 4.

With continued reference to FIG. 2, the precision rails 130, 132 of the cart 114 are rotatably mounted to a respective base or support structure 139, 141 of the printing system 110 by a plurality of bearings, such as the bearing blocks 146 and 148 shown in FIG. 3. In the embodiment shown in FIG. 3, a bearing block 146 is positioned on either end of each precision rail 130, 132 to secure each precision rail 130, 132 to a respective support structure 139, 141 (shown in FIG. 2) and enable rotation of each rail about a longitudinal axis of the rail. The bearing blocks 146 are closed to constrain movement at the ends of the rails. In one embodiment, such closed bearing blocks are similar to those manufactured by Thomson Industries Linear Bearing of Radford, Va. under the manufacturer part number SSUPB16, and each precision rail includes one or more open top bearing blocks 148 between the end bearing blocks to support the rail and cart within a printing station without interfering with the movement of the bearings 116 along the rails 130, 132. In one embodiment, such open top bearings are similar to those manufactured by Thomson Industries Linear Bearing of Radford, Va. under manufacturer part number SSUPBO16. An open top bearing design allows for the bearings 16 to continuously slide over the top of the rail passed the open top bearing without interference from a bearing. While one particular bearing arrangement has been described, the reader should understand that any desired bearing or bearing arrangement may be used. Moreover, any other way for rotatably mounting the bearings can be implemented.

With continued reference to FIG. 3, each precision rail 130, 132 is rotatable axially within the bearings 146 by an actuator 156. The actuator 156 includes a drive shaft 158 operatively coupled to a drive gear 160. The drive gear 160 is operatively coupled to a driven gear 162, which is rotationally secured to the precision rail 130, and a driven gear 164, which is rotationally secured to the precision rail 132. The actuator 156 is operatively connected to a controller 166, which is configured to operate the actuator 156 and rotate the rails. In the embodiment shown, actuator 156 is a motor, such as a DC or stepper motor. Any other desirable actuator can be used to rotate the precision rails 130, 132.

Although the precision rails 130, 132 in the embodiment shown are rotated by the actuator 156 by cooperation of a drive gear 160 and respective driven gears 162, 164, other drives can be utilized. In one embodiment, a gear train is used. In another embodiment, a friction drive is used. In yet another embodiment, the actuator 156 drives a timing belt operatively coupled to the precision rails 130, 132. Additionally, while only a single actuator 156 has been described, more than one actuator is employed in other embodiments to drive the precision rails 130, 132. In yet other embodiments, a first actuator is provided to drive the precision rail 130 and a second actuator is provided to drive the precision rail 132.

Returning to FIG. 2, the printing system 110 further includes a first cleaner 180 and a second cleaner 182 positioned to engage the surface of the precision rail 130 as the actuator 156 is controlled to rotate the precision rail 130. The first and second cleaners 180, 182 extend along the precision rail 130 through the print zone of the printing station 12. As shown in FIG. 2, the first and second cleaners 180, 182 are mounted to the support structure 139 via a support 185. In other embodiments, the second cleaner 182 is mounted to the support structure 139 by a separate support. In yet other embodiments, one or both of the first and second cleaners 180, 182 are mounted in engagement with the precision rail 130 by any other desired mounting arrangement.

As discussed below, the first and second cleaners 180, 182 are configured to clean errant drips of materials that fell from the ejector heads 122, 124, 126, 128 and collected on the surface of the precision rail 130 as the actuator 156 rotates the precision rail 130 in engagement with the first and second cleaner 180, 182. In the embodiment shown, the first cleaner 180 is a blade configured to clean the surface of the precision rail 130 by scraping the surface as the precision rail 130 rotates against the first cleaner 180. The blade can be rigid or a flexible material. In one particular embodiment, the first cleaner is a metal skive blade. The second cleaner 182 in the embodiment shown is an absorbent member that is fluidly connected to a supply of solvent 188 to enable the member to apply the solvent to the rail and facilitate removal of the material.

A receptacle 186 is positioned below the first cleaner 180 to collect material removed by the first cleaner 180. In FIG. 2, the receptacle 186 is mounted to the support structure 139. In other embodiments, the receptacle 186 is mounted with any other desired mounting arrangement provided the arrangement positions the receptacle to receive the material freed from the rail 130 by the cleaner 180. In one embodiment, the receptacle 186 is configured to be manually emptied. In another embodiment, the receptacle 186 is configured to be emptied by operating an actuator to move a cleaning member through the receptacle to push the accumulated material into another receptacle located at an end of the receptacle or, alternatively, the actuator rotates the receptacle 186 away from the rail 130 to urge the material from the receptacle by the effect of gravity.

With continued reference to FIG. 2, the printing system 110 further includes a third cleaner 190 and a fourth cleaner 192 positioned to engage the surface of the precision rail 132 as the actuator 156 is controlled to rotate the precision rail 132. The third and fourth cleaners 190, 192 extend along the precision rail 130 through the print zone of the printing station 120. The third and fourth cleaners 190, 192 are mounted to the support structure 141 via a support 191. In other embodiments, the fourth cleaner 190 is mounted to the support structure 141 by a separate support. In yet other embodiments, one or both of the third and fourth cleaners 190, 192 are mounted in engagement with the precision rail 132 by any other desired mounting arrangement.

The third and fourth cleaners 190, 192 are configured to clean errant drips of materials fallen from the ejector heads 122, 124, 126, 128 that have collected on the surface of precision rail 132 as the actuator 156 rotates the precision rail 132 in engagement with the third and fourth cleaners 190, 192. In the embodiment shown in FIG. 2, the third cleaner 190 is a blade configured to clean the surface of the precision rail 132 by scraping the surface of the precision rail 132. The blade may be rigid or a flexible material. In one particular embodiment, the third cleaner is a metal skive blade. The fourth cleaner 192 in the embodiment shown is an absorbent member fluidly connected to a supply of solvent 198 so the member can apply the solvent to the rail 132 to facilitate the removal of the material from the rail. The third and fourth cleaners 190, 192 interact differently with rotating rail 132 than the first and second cleaners interact with rotating rail 130 since the rails rotate in the same direction. Consequently, the third and fourth cleaners are on a different side of the rotating rail 132 than the side of the rotating rail 130 on which the first and second cleaners are located. Thus, the third and fourth cleaners are positioned at a different angle of engagement with the rail 132 than the angle of engagement that the first and second cleaners are positioned with respect to rail 130.

A receptacle 196 is positioned below the third cleaner 190 to collect material removed by the third cleaner 190. As shown in FIG. 2, the receptacle 196 is mounted to the support structure 141. In other embodiments, the receptacle 196 has any other desired mounting arrangement. The receptacle 196 can be configured to be manually or automatically emptied as described above with regard to receptacle 186.

As noted above, unwanted contamination from the printing process can accumulate on the precision rails and this contamination can negatively impact the precision movement of the platform on the rails and the printing quality and accuracy. The contaminants can become hardened in the presence of a UV source often employed in three-dimensional printing operations, further adding to the problem.

In operation, the controller 166 of the printing system 110 operates the actuator 156 to rotate the rails 130, 132 against the cleaners 180, 182, 190, 192 to remove material from the rails and overcome the problems associated with contamination buildup on precision rails. With reference to FIG. 3, the controller 166 is controlled to operate the actuator 156 to rotate the drive shaft 158 in the direction D1, causing both driven gears 162, 164 to rotate in the direction D2. With the driven gears 162, 164 operatively coupled to a respective precision rail 130, 132, the precision rails 130, 132 also rotate in the direction D2 about respective bearings 146. The controller 166 can operate the actuator 156 to rotate the precision rails 130, 132 continuously in a relatively slow manner, in an indexing manner in which the rails are incrementally turned a preselected portion of a complete revolution, or in any other desired manner.

As the precision rails 130, 132 are rotated in the direction D2, a surface of the precision rails 130, 132 containing contaminants first engages a respective first or third cleaner 180, 190 to clean the surface. When the first and third cleaners 180, 190 are embodied as blades, the cleaners 180, 190 effectively remove dried or hardened contaminant material off the rails by scraping the contaminants into a respective receptacle 186, 196. After the surface of the precision rail 130, 132 is rotated in engagement with a respective first or third cleaner 180, 190, the surfaces are rotated into engagement with a respective second or fourth cleaner 182, 192. When the second and fourth cleaners 182, 192 are embodied as absorbent members each with a supply of solvent 188, 198, such as acetone, the absorbent members effectively clean contamination still in liquid form, as in the case of uncured build material, and remaining dried or hardened material left behind by the first or third cleaners 180, 190.

When the precision rails 130, 132 are continuously rotated, motion quality of the platform 114 remains unaffected because the rails 130, 132 slide beneath the bearings 116 of the platform 114 during such motion. The relative motion of the precision rails 130, 132 across the bottom surface of the bearings 116 also works to clean the bottom of the bearings 116 as the precision rails 130, 132 slide past the bearings 116. When the precision rails 130, 132 are rotated in an indexing manner, each rail is incrementally rotated a preselected amount prior to each platform 114 transitioning onto the precision rails 130, 132, thereby revealing a clean surface for each platform 114 to travel upon.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer comprising:
   an ejector head configured to eject a material in a print zone;

a first cylindrical member extending through the print zone;
an actuator operatively coupled to the first cylindrical member and configured to rotate the first cylindrical member about a longitudinal axis of the first cylindrical member;
a platform configured to move in a process direction along a surface of the first cylindrical member and receive material ejected by the ejector head in the print zone, the process direction being parallel to the longitudinal axis of the first cylindrical member; and
a first cleaner positioned to engage the surface of the first cylindrical member as the first cylindrical member is rotated by the actuator to remove material accumulated on the surface of the first cylindrical member.

2. The printer of claim 1, the first cleaner comprising:
a blade configured to engage the surface of the first cylindrical member and remove material from the surface of the first cylindrical member.

3. The printer of claim 1, the first cleaner comprising:
an absorbent material; and
a supply of solvent fluidly connected to the absorbent material to enable the absorbent material to apply solvent to the surface of the first cylindrical member.

4. The printer of claim 1 further comprising:
a second cleaner positioned to engage the surface of the first cylindrical member as the first cylindrical member is rotated to remove material accumulated on the surface of the first cylindrical member.

5. The printer of claim 1 further comprising:
a receptacle positioned to collect material removed from the surface of the first cylindrical member by the first cleaner.

6. The printer of claim 1 further comprising:
a second cylindrical member extending through the print zone, the actuator operatively coupled to the second cylindrical member and configured to rotate the second cylindrical member about a longitudinal axis of the second cylindrical member, the platform being configured to move in the process direction through the print zone along a surface of the second cylindrical member; and
a second cleaner positioned to engage the surface of the second cylindrical member as the second cylindrical member is rotated about the longitudinal axis of the second cylindrical member to remove material accumulated on the surface of the second cylindrical member.

7. The printer of claim 6 further comprising:
a receptacle positioned to collect material removed from the surface of the second cylindrical member by the second cleaner.

8. The printer of claim 6 further comprising:
a third cleaner positioned to engage the surface of the second cylindrical member as the second cylindrical member is rotated about the longitudinal axis of the second cylindrical member to remove material accumulated on the surface of the second cylindrical member.

9. The printer of claim 1, the first cylindrical member and the platform being configured to enable the platform to be moved along the surface of the first cylindrical member in the process direction as the actuator rotates the first cylindrical member about the longitudinal axis of the first cylindrical member.

10. The printer of claim 6, the first cylindrical member, the second cylindrical member, and the platform being configured to enable the platform to be moved along the first cylindrical member and the second cylindrical member in the process direction as the actuator rotates the first cylindrical member about the longitudinal axis of the first cylindrical member and as the actuator rotates the second cylindrical member about the longitudinal axis of the second cylindrical member.

11. A method of operating a printer, the method comprising:
operating a platform with a controller to move the platform in a process direction along a surface of a first cylindrical member through a print zone of an ejector head, the process direction being parallel to a longitudinal axis of the first cylindrical member;
operating the ejector head with the controller to eject material to a surface of the platform in the print zone; and
operating an actuator with the controller to rotate the first cylindrical member about the longitudinal axis of the first cylindrical member while a first cleaner engages the surface of the first cylindrical member to remove material accumulated on the surface of the first cylindrical member.

12. The method of claim 11, the operating of the actuator with the controller to rotate the first cylindrical member about the longitudinal axis of the first cylindrical member while the first cleaner engages the surface of the first cylindrical member further comprises:
operating the actuator with the controller to rotate the first cylindrical member about the longitudinal axis of the first cylindrical member while a blade engages the surface of the first cylindrical member to remove material from the surface of the first cylindrical member.

13. The method of claim 11, the first cleaner comprising an absorbent material and a supply of solvent fluidly connected to the absorbent material, the method further comprising:
supplying the absorbent material with the solvent fluidly connected to the absorbent material; and
operating the actuator with the controller to rotate the first cylindrical member about the longitudinal axis of the first cylindrical member while the absorbent material engages the surface of the first cylindrical member to apply the solvent to the surface of the first cylindrical member.

14. The method of claim 11 further comprising:
operating the actuator with the controller to rotate the first cylindrical member about the longitudinal axis of the first cylindrical member while a second cleaner engages the surface of the first cylindrical member to remove material accumulated on the surface of the first cylindrical member.

15. The method of claim 11 further comprising:
collecting material removed from the surface of the first cylindrical member by the first cleaner with a receptacle positioned to collect material removed from the surface of the first cylindrical member.

16. The method of claim 11 further comprising:
operating the platform with the controller to move the platform in the process direction along a surface of a second cylindrical member through the print zone of an ejector head, the process direction being parallel to a longitudinal axis of the second cylindrical member; and
operating the actuator with the controller to rotate the second cylindrical member about the longitudinal axis of the second cylindrical member while a second cleaner engages the surface of the second cylindrical member to remove material accumulated on the surface of the second cylindrical member.

17. The method of claim 16 further comprising:
collecting material removed from the surface of the second cylindrical member by the second cleaner with a receptacle positioned to collect material removed from the surface of the second cylindrical member.

18. The method of claim 16 further comprising:
operating the actuator with the controller to rotate the second cylindrical member about the longitudinal axis of the second cylindrical member while a third cleaner engages the surface of the second cylindrical member to remove material accumulated on the surface of the second cylindrical member.

19. The method of claim 11 further comprising:
operating the platform with the controller to move the platform along the surface of the first cylindrical member in the process direction as the actuator rotates the first cylindrical member about the longitudinal axis of the first cylindrical member.

20. The method of claim 16 further comprising:
operating the platform with the controller to move the platform along the surface of the first cylindrical member and the surface of the second cylindrical member in the process direction as the actuator rotates the first cylindrical member about the longitudinal axis of the first cylindrical member and as the actuator rotates the second cylindrical member about the longitudinal axis of the second cylindrical member.

* * * * *